(12) United States Patent
Fennell

(10) Patent No.: US 9,156,336 B2
(45) Date of Patent: Oct. 13, 2015

(54) GOLF CART RETRACTABLE ENCLOSURE

(71) Applicant: Jeffrey Charles Fennell, Southwest Ranches, FL (US)

(72) Inventor: Jeffrey Charles Fennell, Southwest Ranches, FL (US)

(*) Notice: Subject to any disclaimer, the term of this patent is extended or adjusted under 35 U.S.C. 154(b) by 18 days.

(21) Appl. No.: 14/145,499

(22) Filed: Dec. 31, 2013

(65) Prior Publication Data
US 2014/0265428 A1  Sep. 18, 2014

Related U.S. Application Data

(60) Provisional application No. 61/852,342, filed on Mar. 15, 2013.

(51) Int. Cl.
*B60J 5/08* (2006.01)
*B60J 5/04* (2006.01)

(52) U.S. Cl.
CPC *B60J 5/08* (2013.01); *B60J 5/0487* (2013.01); *Y10T 29/49826* (2015.01)

(58) Field of Classification Search
CPC ...... B60J 5/08; B60J 5/0487; Y10T 29/49826
See application file for complete search history.

(56) References Cited

U.S. PATENT DOCUMENTS

| 236,126 | A | * | 12/1880 | Washburn | 160/276 |
| 262,609 | A | * | 8/1882 | Myrick | 296/143 |
| 3,958,826 | A | | 5/1976 | Upton | |
| 4,014,589 | A | * | 3/1977 | Yerkey | 296/77.1 |
| 6,439,637 | B1 | * | 8/2002 | Tyrer | 296/79 |
| 6,776,445 | B1 | | 8/2004 | Conner et al. | |
| 6,979,040 | B1 | | 12/2005 | Brewer, Jr. | |
| 7,354,092 | B2 | * | 4/2008 | Showalter et al. | 296/77.1 |
| 8,297,679 | B2 | | 10/2012 | Held | |
| 8,356,855 | B2 | | 1/2013 | Sams | |
| 2013/0062905 | A1 | * | 3/2013 | Held | 296/141 |

OTHER PUBLICATIONS

Fennell, Jeffrey Charles; U.S. Provisional Application entitled: Golf Cart Retractable Enclosure, having U.S. Appl. No. 61/852,342, filed Mar. 15, 2013, 33 pgs.

* cited by examiner

*Primary Examiner* — Pinel Romain

(57) ABSTRACT

A retractable enclosure for open sided golf carts and/or recreational vehicles. Golf cart retractable enclosures have roll-back doors which coil into housings and onto a tube within each housing for storage. The roll-back door panels are made up of sheets of flexible transparent plastic and or flexible opaque fabric material. Each roll-back door panel has an upper side edge which is received in a horizontal upper track extending from the front vertical post to the roll-back panel housing. The tubes are rotated by either electric motors and or springs in one direction to open and store the roll-back doors and rotated in an opposite direction to close the roll back doors.

20 Claims, 15 Drawing Sheets

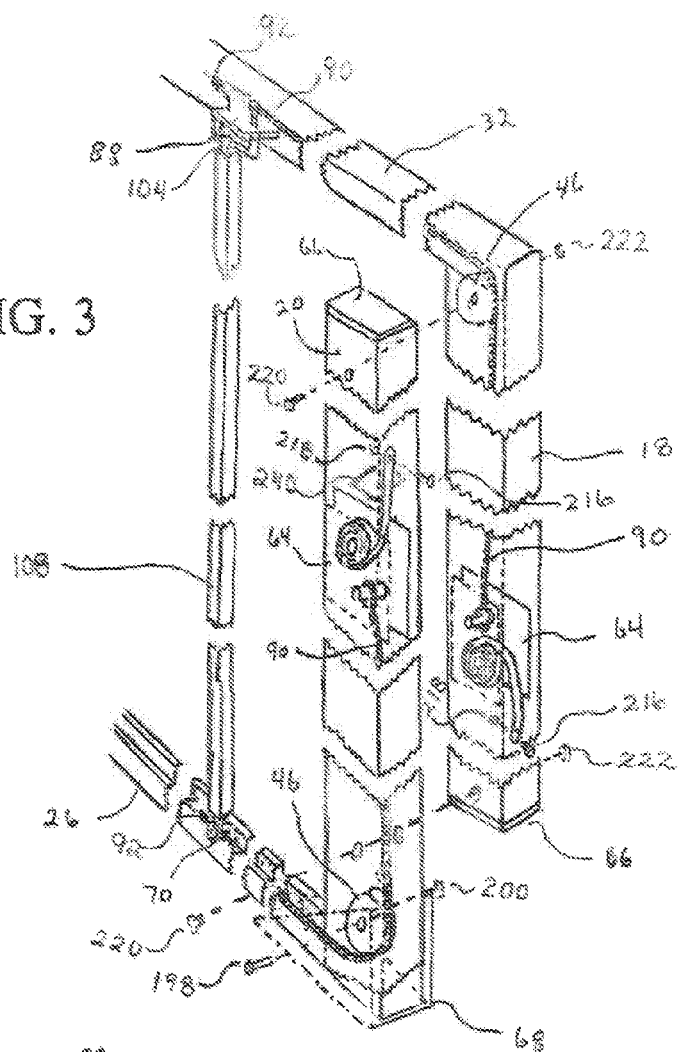
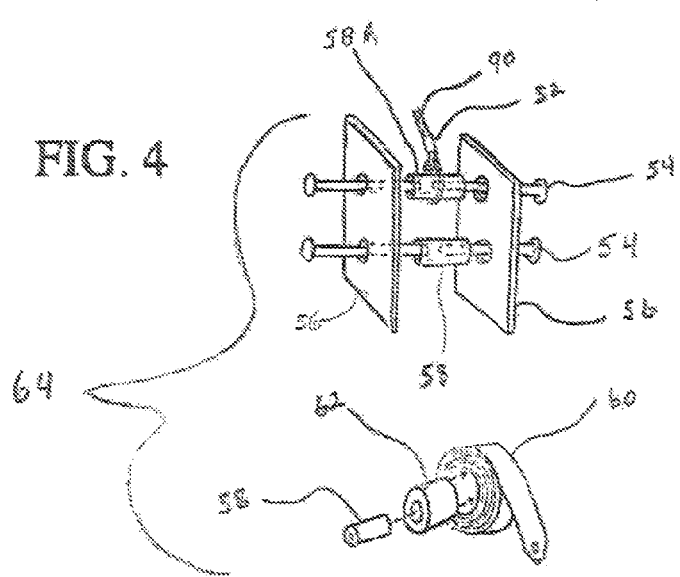

FIG. 9
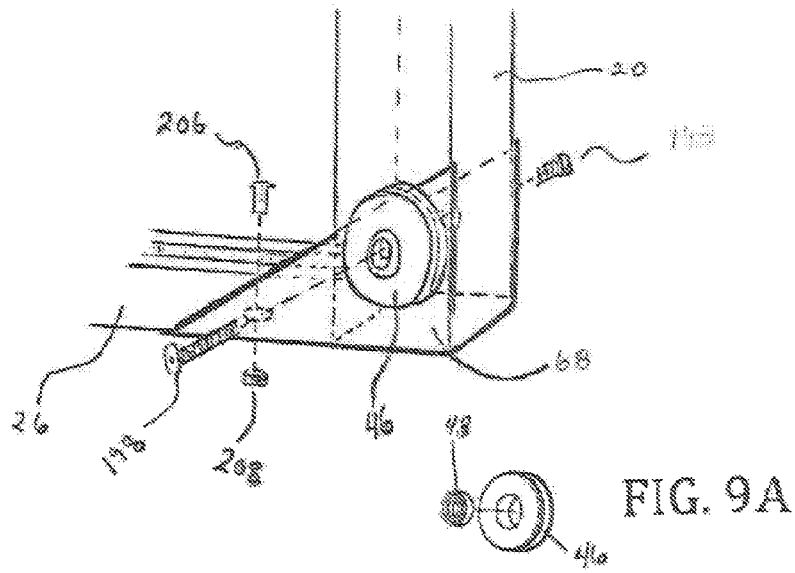
FIG. 9A
FIG. 10
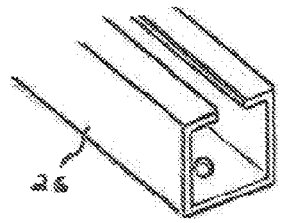
FIG. 11
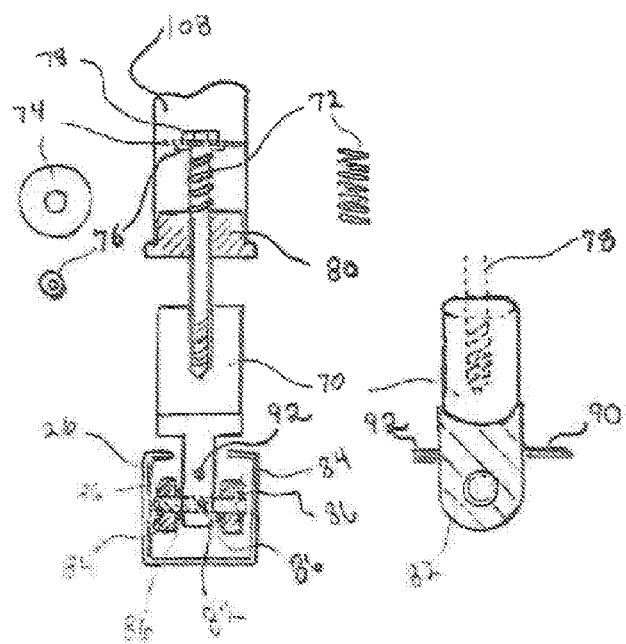

FIG 14A
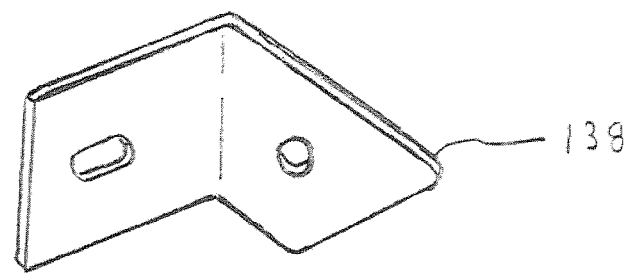
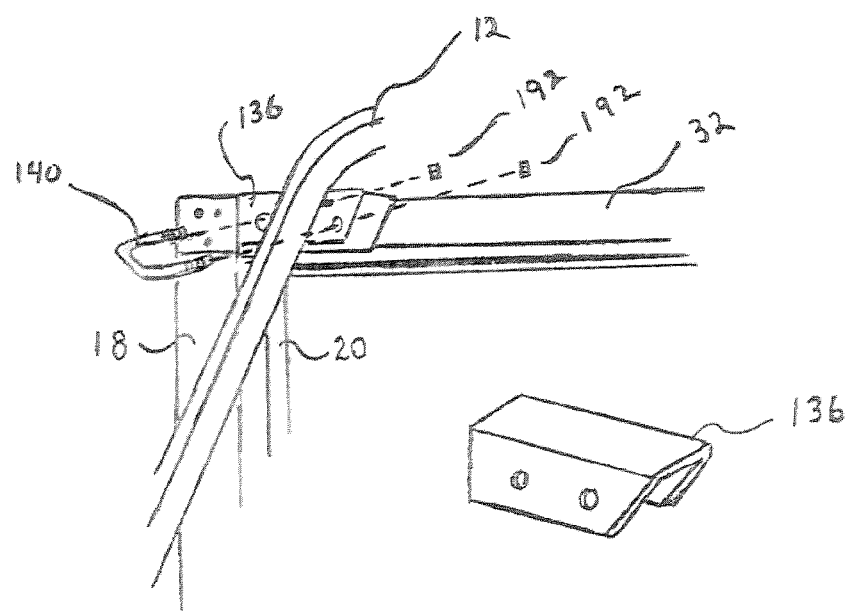
FIG 14B

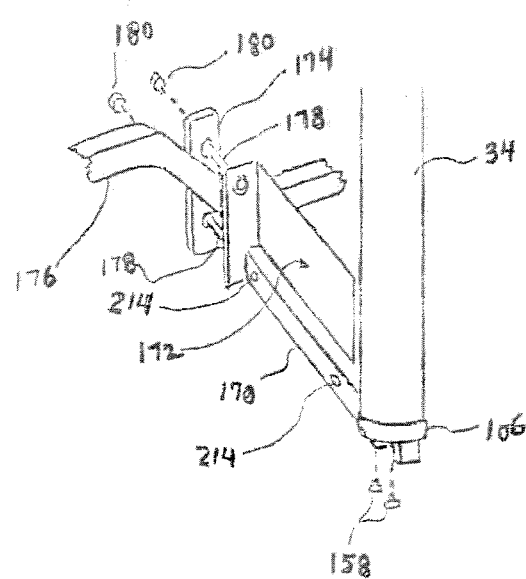
FIG. 21
FIG. 22
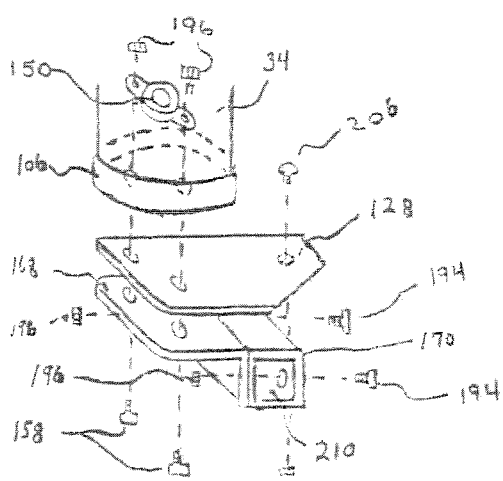
FIG. 23
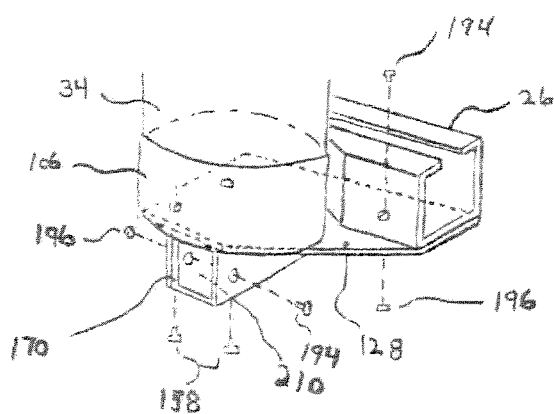

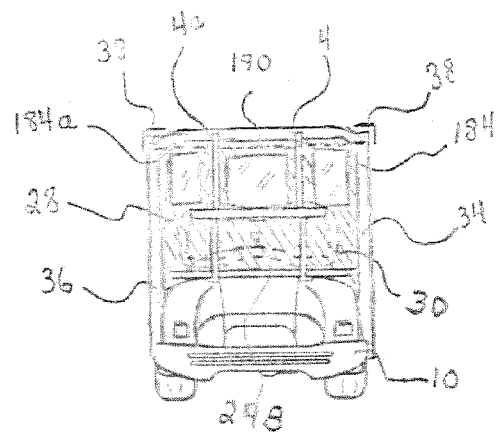
FIG. 26
FIG. 27
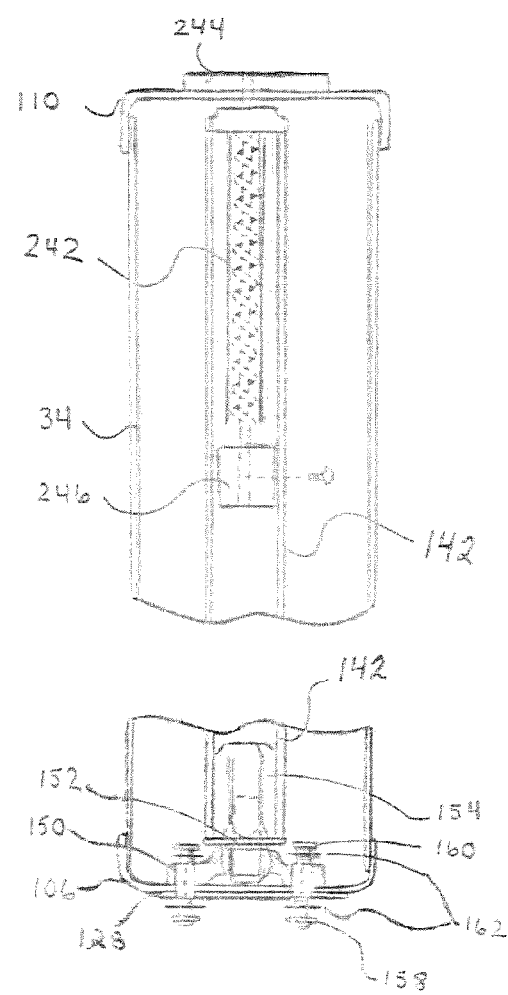

GOLF CART RETRACTABLE ENCLOSURE

REFERENCE TO RELATED APPLICATIONS

This application claims priority to U.S. Provisional Application No. 61/852,342, filed Mar. 15, 2013, which is hereby incorporated by this reference herein in its entirety.

TECHNICAL FIELD

The current disclosure relates to golf carts. Particularly, the current disclosure relates to a retractable enclosure for the normally-open sides of a golf cart or similar recreational vehicle.

BACKGROUND

Originally, golf carts and similar recreational vehicles are built with open sides allowing the occupants to be adversely affected by the weather. In U.S. Pat. No. 6,776,445 to Conner et al., additional side clearance is required for the doors to open or close. There is also the possibility of the wind catching the door when opening and closing the doors or when the golf cart or vehicle is in motion if the doors are not properly secured. In U.S. Pat. No. 6,979,040 to Brewer, Jr., the enclosure offers limited protection to occupants due to panels that do not go all the way to the bottom of the cart and are not secured on the leading or trailing side edges. In U.S. Pat. No. 8,356,855 to Sams, significant modification of the golf cart is required as you must replace the OEM factory roof and add additional weight and height to the uppermost point of the golf cart with this enclosure.

There are many configurations of golf cart enclosures used on golf carts. Many require manually rolling and unrolling of the enclosures, using zippers and snaps to secure the enclosures which is time consuming. Thus there exists a need for a retractable enclosure for golf carts and similar recreational vehicles that is readily and easily deployable with little effort.

SUMMARY

Disclosed is a retractable enclosure mountable on a recreational vehicle, the retractable enclosure comprising a roll-back panel movable between an open position and a closed position, the roll-back panel in the open position being in a rolled condition, the roll-back panel having a leading edge; and a tensioning element connected to the leading edge of the roll-back panel.

Also disclosed is a retractable enclosure system mountable on a recreational vehicle, the system comprising a first roll-back panel movable between an open position and a closed position on a first side of the recreational vehicle, the first roll-back panel in the open position being in a rolled condition, the first roll-back panel having a leading edge; a first motor operatively associated with the first roll-back panel to move the first roll-back panel between the closed position and the open position; a second roll-back panel movable between an open position and a closed position on a second side of the recreational vehicle, the second roll-back panel in the open position being in a rolled condition, the second roll-back panel having a leading edge; and a second motor operatively associated with the second roll-back panel to move the second roll-back panel between the closed position and the open position.

Also disclosed is a method of installing a retractable enclosure system mounted on a recreational vehicle, the method comprising placing a first roll-back panel on a first side of the recreational vehicle, the first roll-back panel movable between an open position and a closed position, the first roll-back panel in the open position being in a rolled condition, the first roll-back panel in the closed position covering at least a portion of the first side; and placing a second roll-back panel on a second side of the recreational vehicle, the second roll-back panel movable between an open position and a closed position, the second roll-back panel in the open position being in a rolled condition, the second roll-back panel in the closed position covering at least a portion of the second side.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 3 is an exploded view of the vertical posts.

FIG. 4 is an exploded view of the constant force spring travel assembly, center roller, and spring.

FIG. 9 is an exploded view of the outer vertical post lower end and related parts.

FIG. 9A is an exploded view of the sheave and bearing.

FIG. 10 is a view of the lower horizontal track end.

FIG. 11 is a cutaway view of the lower track, track bar, and wheeled track roller.

FIG. 14A is a perspective view of the vertical post lower inside mounting bracket style 2.

FIG. 14B is a perspective view of the upper horizontal track inside mounting bracket style 2.

FIG. 21 is a perspective view of the roll-back panel housing lower support.

FIG. 22 is an exploded view of the roll-back panel housing lower mounting plate, bracket, and support tube.

FIG. 23 is a perspective view of the roll-back panel housing lower mounting plate, and lower horizontal track.

FIG. 26 is a rear view of the rear of the golf cart, rear filler panels, and rear rollup window.

FIG. 27 is a cutaway view of spring inside roll back panel housing.

DETAILED DESCRIPTION

Figure 1:
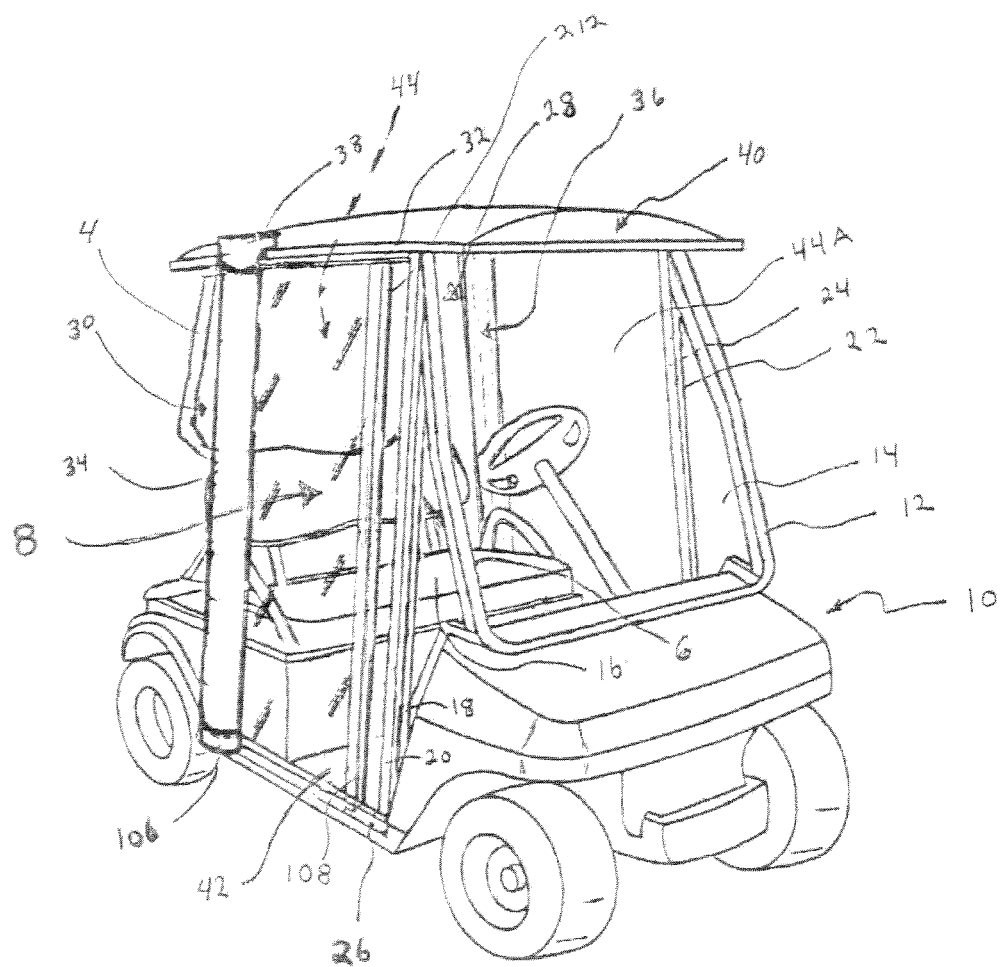
FIG. 1 is a perspective view of a golf cart with the retractable enclosure assembly installed upon the golf cart.
Figure 1A:
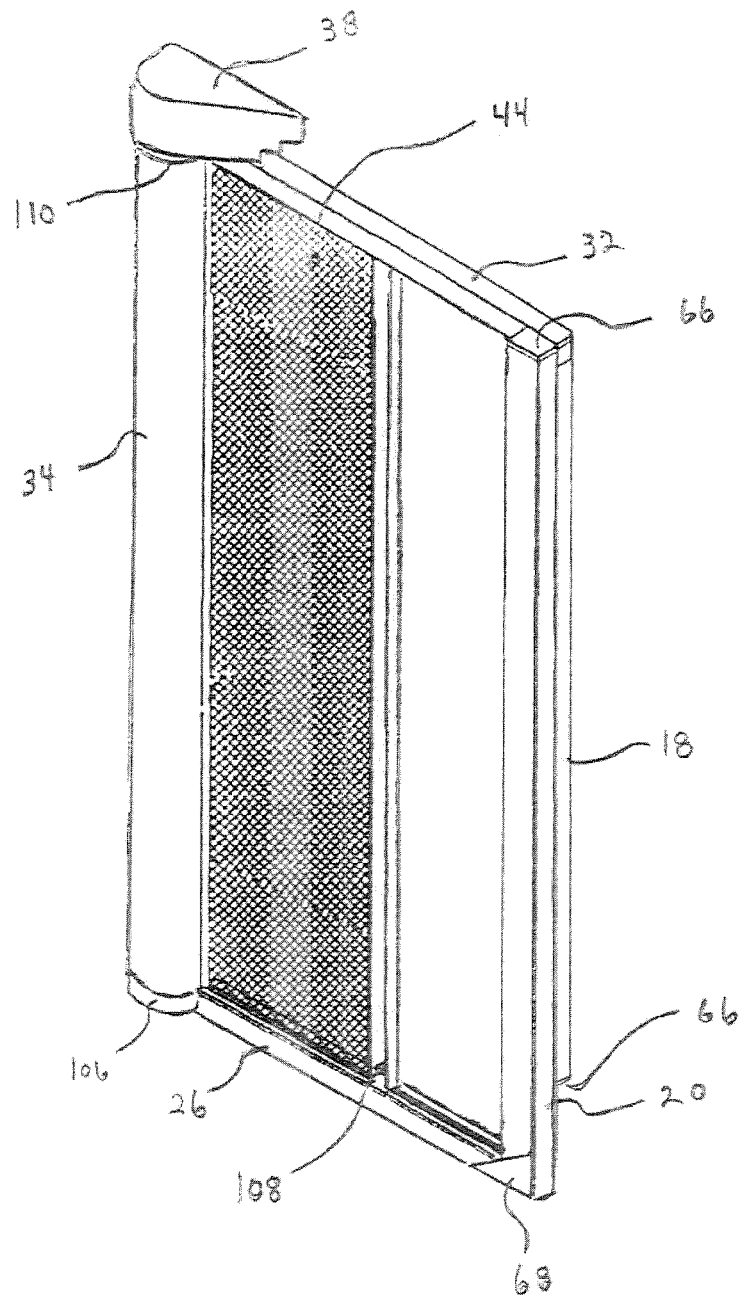

This disclosure includes a golf cart retractable enclosure that connects the roller tubes to reversible electric motors, which open and close the roll-back doors upon receiving current of opposite polarities.

This disclosure also includes a golf cart retractable enclosure that allows the doors to still be opened and closed manually when the motors are not receiving current and the doors are in the closed position.

This disclosure also includes a golf cart retractable enclosure that in lieu of an electric motor alternatively utilizes roller tubes which manually rotate, having a spring inside the roller tube to coil or recoil the flexible panel for storage within the roll-back panel housing.

This disclosure also includes a golf cart retractable enclosure that is operated by a control switch, within or outside of the enclosure that controls the roller tubes which are rotated by reversible electric motors.

This disclosure also includes a golf cart retractable enclosure that includes door panels made of fabric and/or clear plastic flexible material attached to one another or singularly, which coil around the roller tubes for storage. The roller tubes are circular in cross-section.

This disclosure also includes a golf cart retractable enclosure that has side roll-back doors each having the top edge portion of the door panels received in upper horizontal channels wherein the panels are sliding into and out of with respect to the channels.

This disclosure also includes a golf cart retractable enclosure that as the roller tubes rotate in a first direction, the side roll-back doors roll up on the roller tubes, and as the roller tubes rotate in an opposite direction, the side roll-back doors unspool and slide down the tracks to close the openings.

This disclosure also includes a golf cart retractable enclosure that has the rear edge of the fabric and/or clear plastic panel attached to the roller tubes.

This disclosure also includes a golf cart retractable enclosure that has a one way roller clutch mounted inside the upper ends of the roller tubes. When the retractable door is closing and becomes obstructed the motor can continue to run and will not put any force upon the retractable door or uncoil the retractable door.

This disclosure also includes a golf cart retractable enclosure that has a circuit breaker which is activated upon either the side roll-up door encountering resistance above a selected level when being closed, or opened.

This disclosure also includes a golf cart retractable enclosure that has constant force spring assemblies inside the front vertical frame members, which are attached to assemblage within the upper and lower horizontal tracks by cable to maintain tension on the flexible door panels.

This disclosure also includes a golf cart retractable enclosure that can be operated by a switch within, or outside of, the enclosure.

This disclosure also includes a golf cart retractable enclosure that can be operated by remote control switch.

This disclosure also includes a golf cart retractable enclosure with an optional key switch.

This disclosure also includes a control box for electronics.

This disclosure also includes a golf cart retractable enclosure that has a rear roll-up window along with side rear filler panels mounted adjacent to the rear portion of the roof.

This disclosure also includes a golf cart retractable enclosure that has front filler panels between the front vertical posts and the front golf cart roof supports.

This disclosure also includes a golf cart retractable enclosure that works on a golf cart or recreational vehicle having one seat, two seats, or multiple seats.

Disclosed is a retractable enclosure and associated methods, systems, devices, and various apparatus. It would be understood by one of skill in the art that the disclosed retractable enclosure is described in but a few exemplary embodiments among many. No particular terminology or description should be considered limiting on the disclosure or the scope of any claims issuing therefrom.

One embodiment of a retractable enclosure 8 is disclosed and described in FIG. 1.

Referring now to FIG. 1, shown is a two-person golf cart 10 with the retractable enclosure 8 affixed to golf cart 10. The retractable enclosure 8 has been developed for affixing to an open sided golf cart or recreational vehicle to provide protection to occupants of golf cart 10 from inclement weather. The retractable enclosure 8 includes vertical posts 18 and 20 and tracks 32 and 26 along with roll-back panel housing 34 on the right passenger side of the golf cart 10. Vertical posts 22 and 24, roll-back panel housing 36 and upper and lower tracks similar to 32 and 26, but not shown in the diagram, are located on the left driver side of golf cart 10. In various embodiments, the roll-back panels 44 and 44*a* are made of a flexible transparent material on the upper half and a flexible non-transparent material on the lower half with guide tape 102 on the top edge, giving the roll-back panels 44 and 44*a* the flexibility to coil onto roller tube 142 inside roll-back panel housing 34 and 36, respectively. The flexible non-transparent material also runs the length of the leading edge of roll-back panels 44 and 44*a*.

In another embodiment, the full roll-back panels 44 and 44*a* may be made of flexible transparent material with guide tape 102 on the top edge and flexible non-transparent material on the leading edge.

The flexible non-transparent material on the leading edge of roll-back panels 44 and 44*a* wrap around track bar 108 and foam cushion strip 212, which is on the leading edge of track bar 108. The flexible non-transparent material on roll-back panels 44 and 44*a* then each fastens to itself with hook and loop fastener forming a sleeve around track bar 108 and foam cushion strip 22. Track bar 108 and foam cushion sleeve 212 are located in mirror fashion on the left drivers side of golf cart 10 but not visible in FIG. 1. The trailing edge of roll-bank panels 44 and 44*a*'s flexible material attach to roller tube 142 with adhesive and are housed inside of roll-back panel housing 34 and 36, respectively. Constant force spring 64 is housed within vertical posts 18, 20, 22 and 24 allowing it to slide within the posts and maintain tension on track bar 108

Filler panels 16 and 14 are supported by OEM factory golf cart frame supports 6 and 12 and vertical posts 20 and 22, respectively, providing additional weather shielding. Flexible rear corner filler panels 30 and 28 attach to, and in between, roll-back panel housing 34 and 36, respectively, and OEM factory golf cart rear roof supports 4 and 4a, not shown, respectively. The rear of the retractable enclosure 8 optionally includes a roll-up flexible panel positioned in between the OEM factory golf cart rear roof supports 4 and 4a to provide additional protection from the weather.

Hereinafter, all descriptions and figures refer to the right passenger side of the golf cart 10 and retractable enclosure 8, unless otherwise specifically noted. The left driver side retractable enclosure assembly is a mirror image of the right passenger side enclosure assembly.

Figure 2:
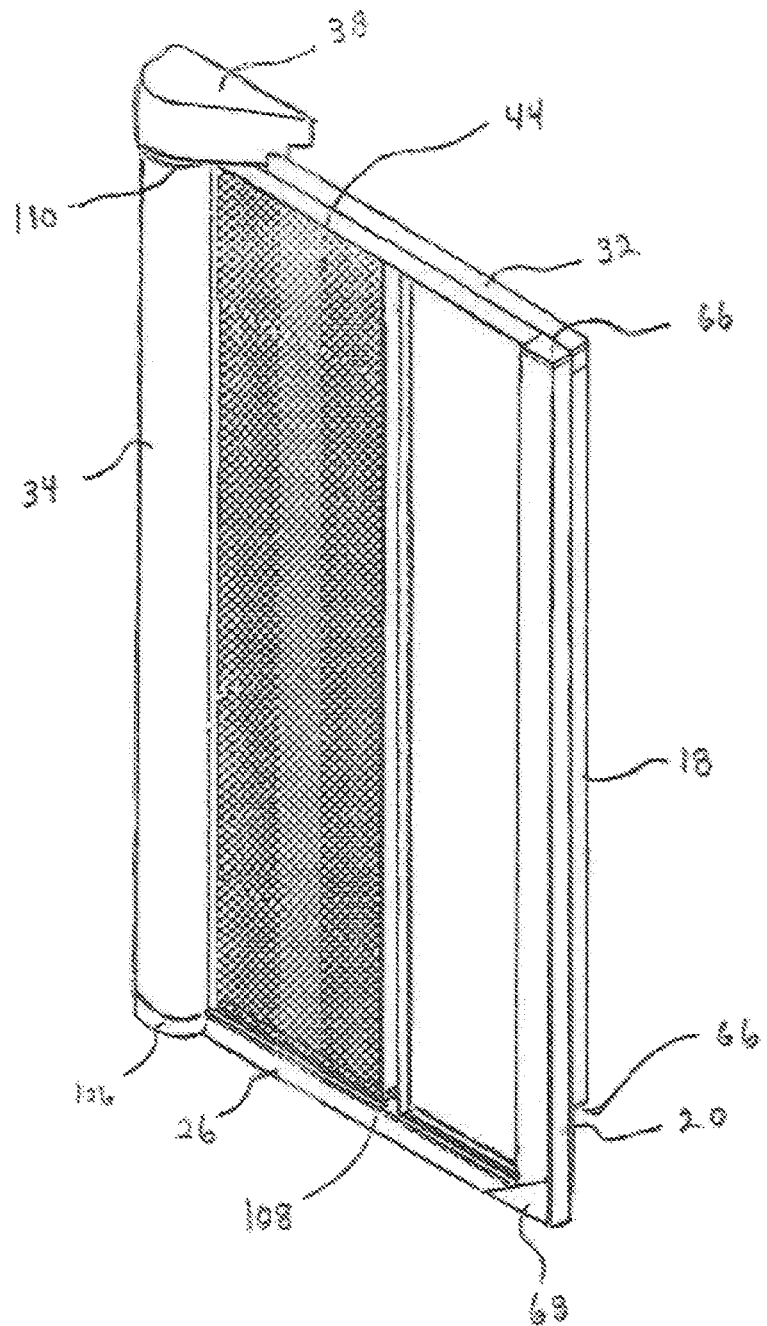
FIG. 2 is a perspective view of the retractable enclosure assembly in FIG. 1.

Referring now to FIG. 2, shown is a perspective view of a right side retractable enclosure assembly.

Referring now to FIG. 3, shown is an exploded view of vertical posts 18 and 20 showing the inside view with constant force spring assembly 64 mounted inside posts 18 and 20 attached with screw 216 and nut 218. Constant force spring assembly 64 inside post 20 travels in a downward direction and back. Cable 90 is attached to constant force spring assembly 64 by looping cable 90 around spacer 58a forming a loop with swage sleeve 52 compressed on it. Cable 90 is guided by sheave 46 inside post 20 to bottom track guide roller 70 which has a hole through it to receive cable 90. Cable 90 is then terminated on the opposite side of entry with cable end stop 92. In vertical post 18, constant force spring assembly 64 travels in an upward and back direction from attachment point to vertical post 18, is guided around sheave 46 and attaches to upper track slide 88 which has a hole through it to receive cable 90. Cable 90 terminates on opposite side of entry to upper track slide 88 with cable end stop 92. Vertical posts 18 and 20 are attached together with screw 220 and nut 222. Sheave 46 is attached in the top of vertical posts 18 and 20 by screw 220 and nut 222. Sheave 46 in the bottom of vertical post 20 is attached to post 20 with mate rivet 198 and 200. Vertical post 20 has a rectangular end plug 66 in the uppermost end and vertical post 18 has a rectangular plug 66 in the lowermost end. Track bar 108 is attached at the uppermost end to track slide 88 by track bar U-bracket 104. Track bar 108 is attached to bottom track guide roller 70 at the lowermost end.

In another embodiment, cable 90 is attached to track slide 88 and bottom track guide roller 70 with adhesive glue, in lieu of cable end stop 92.

In another embodiment, magnet 240 is mounted adjacent to, and makes contact with, spring 60 of constant force spring assembly 64, to assist in keeping tension on cable 90 when track bar 108 with track bar guide roller 70 and track slide 88 are in the closed position next to vertical posts 18, 20, 22 and 24.

Referring now to FIG. 4, shown is an exploded view of constant force spring assembly 64.

In between side plates 56, which are a low friction plastic, are spacers 58 and 58a. Cable 90 is made into a loop around spacer 58a and crimped with swage 52 onto cable 90. Constant force spring drum roller 62 has constant force spring 60 wrapped onto itself and it slides onto spacer 58.

Figure 5:
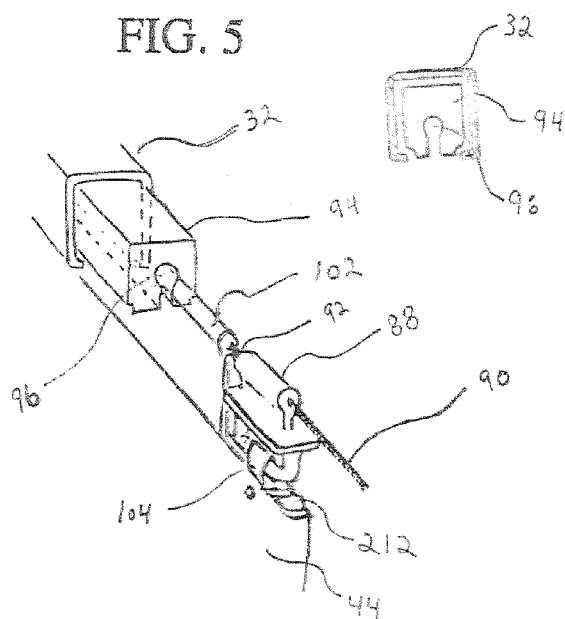
FIG. 5 is an exploded view of the top track and slide assembly.

Referring now to FIG. 5, shown is an exploded view of horizontal upper track 32 which is made of metal, such as aluminum, which has an open internal space and bottom turned-in edges to keep low friction plastic track insert 94 from falling out. Low friction plastic track insert 94 has a channel 96 within to receive guide tape 102, track slide 88, cable 90 and cable end stop 92.

Figure 6:
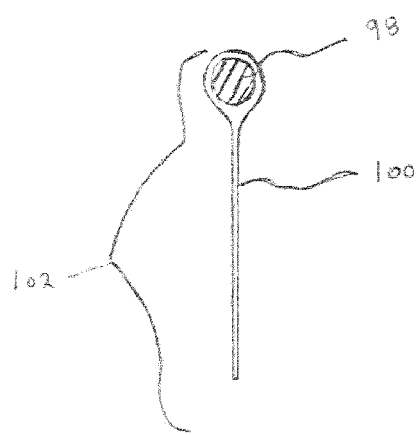
FIG. 6 is a cut-away view of the guide tape.

Referring now to FIG. 6, shown is a cutaway view of guide tape 102. Woven rope 98 is encased by low friction fabric 100 which sewn or adhered onto woven rope 98.

Figure 7:
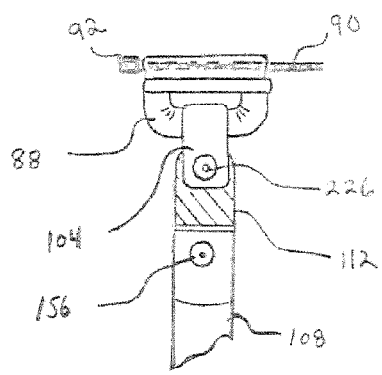
FIG. 7 is a side view of the upper track bar assembly.

Referring now to FIG. 7, shown is a side view of the upper vertical end of track bar 108 which has track bar top end 112 inserted into track bar 108. Both track bar 108 and track bar top end 112 are held together by rivet 156, which runs through both track bar 108 and track bar top end 112. Track bar U-bracket 104 wraps around track slide 88 and attaches to track bar top end 112 by means of screw 226 and nut 228, not shown.

Figure 8:
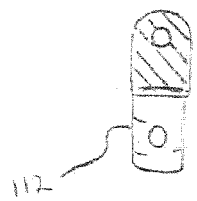
FIG. 8 is a side view of the upper track bar end insert.

Referring now to FIG. 8, shown is a side view of track bar 112 top end.

Referring now to FIG. 9, shown is an exploded view of the outer vertical post 20 showing sheave 46 inside vertical post 20 with angle bracket 68 on the outside edges of vertical post 20. Mate rivet 198 goes through angle bracket 68, vertical post 20 and sheave 46. Horizontal lower track 26 attaches to angle bracket 68 with screw 206 going through horizontal lower track 26 and angle bracket 68. Nut 208 is secured on screw 206.

Referring now to FIG. 9A, shown is an exploded view of sheave 46 and sheave bearing 48.

Referring now to FIG. 10, shown is an end view of horizontal lower track 26.

Referring now to FIG. 11, shown is a cutaway view of the lower end of track bar 108 showing what is inside the end of lower track bar 108. Track bar lower end guide plug 80 is pressed into track bar 108 lower end. Bolt 78 has felt washer 74 under the head. Felt washer 74 has washer 76 under it. Washer 76 has spring 72 under it with bolt 78 in the middle of spring 72. Spring 72 is on top of track bar lower end guide plug 80. Bolt 78 threads into bottom track guide roller 70. Bottom track guide roller 70 has axle 82, wheels 84 and washers 86.

Figure 12:
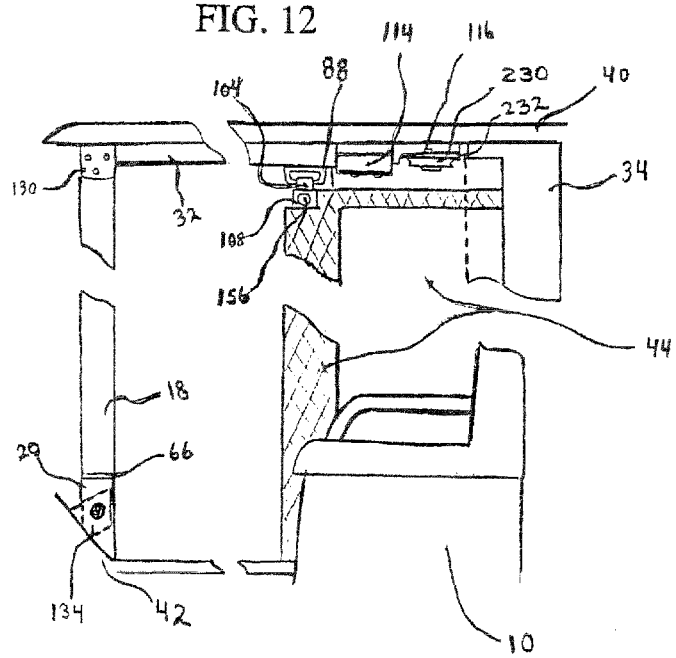
FIG. 12 is a right inside view of a golf cart with a retractable enclosure assembly installed onto the golf cart.

Referring now to FIG. 12, shown is a right side interior view of the retractable enclosure. The purpose of the drawing is to show mounting position of inside components not readily seen from the outside view. Limit switch bracket 114 attaches to horizontal upper track 32 by adhesive in front of guide roller 230. Guide roller 230 is attached by rivet 116 to horizontal upper track guide roller plate 232 which is attached to horizontal upper track 32 by adhesive. Mounting plate 130 connects vertical post 18 upper end to horizontal upper track 32 with screws 198 and nuts 200. Lower front mounting bracket 134 for Yamaha brand golf cart attaches vertical outer post 20 to golf cart 10.

Figure 13A:
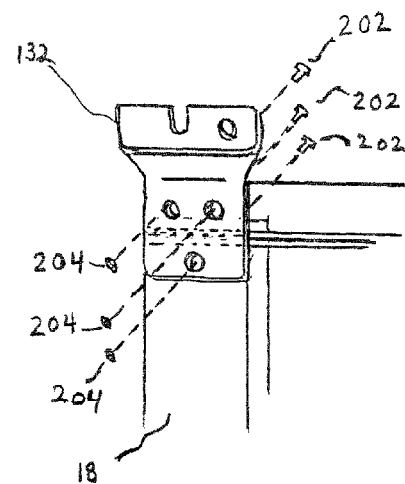
FIG. 13A is a perspective view of the upper horizontal track and vertical post upper end inside mounting bracket style 1.
Figure 13:
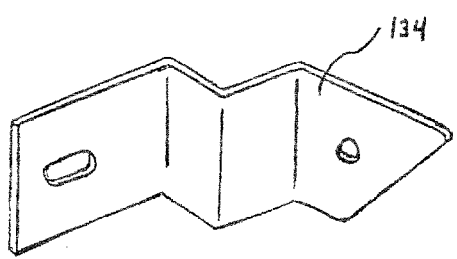
FIG. 13 is a perspective view of the vertical post lower inside mounting bracket style 1.

Referring now to FIG. 13, shown is a perspective view of lower front bracket 134 for Yamaha™ brand golf cart.

Referring now to FIG. 13A, shown is a perspective view of upper front mounting bracket 132 for Yamaha brand golf carts. Bracket 132 sits on top of or over mounting plate 130.

Figure 14:
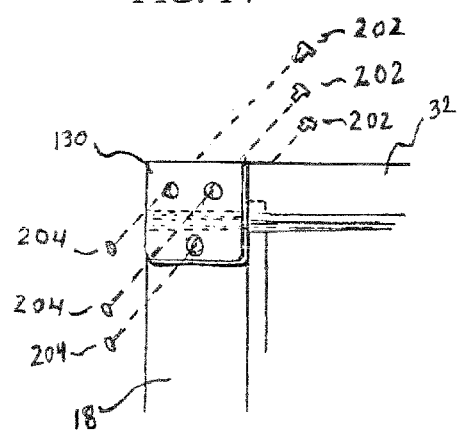
FIG. 14 is a perspective view of the vertical post upper end to upper horizontal track mounting plate.

Referring now to FIG. 14, shown is a perspective view of the mounting plate 130 which attaches inner vertical post 18 to horizontal upper track 32 with screw 198 and nut 200. Inner vertical post 18 attaches to outer vertical post 20 with screw 202 and nut 204.

Referring now to FIG. 14A, shown is the lower front bracket 138 for a Club Car™ brand golf cart attaching outer vertical post 20 to golf cart floor board (not shown).

Referring now to FIG. 14B, shown is upper front bracket 136 for a Club Car brand golf cart, which attaches to horizontal upper track 32 by adhesive. Upper front bracket 136 attaches to golf cart roof support 12 by means of U-bolt 140 and nuts 192. In a second embodiment, upper front bracket 136 may be attached to horizontal upper track 32 with screws. In a third embodiment, upper front bracket 136 may be attached to horizontal upper track 32 with spot welding.

Figure 15:
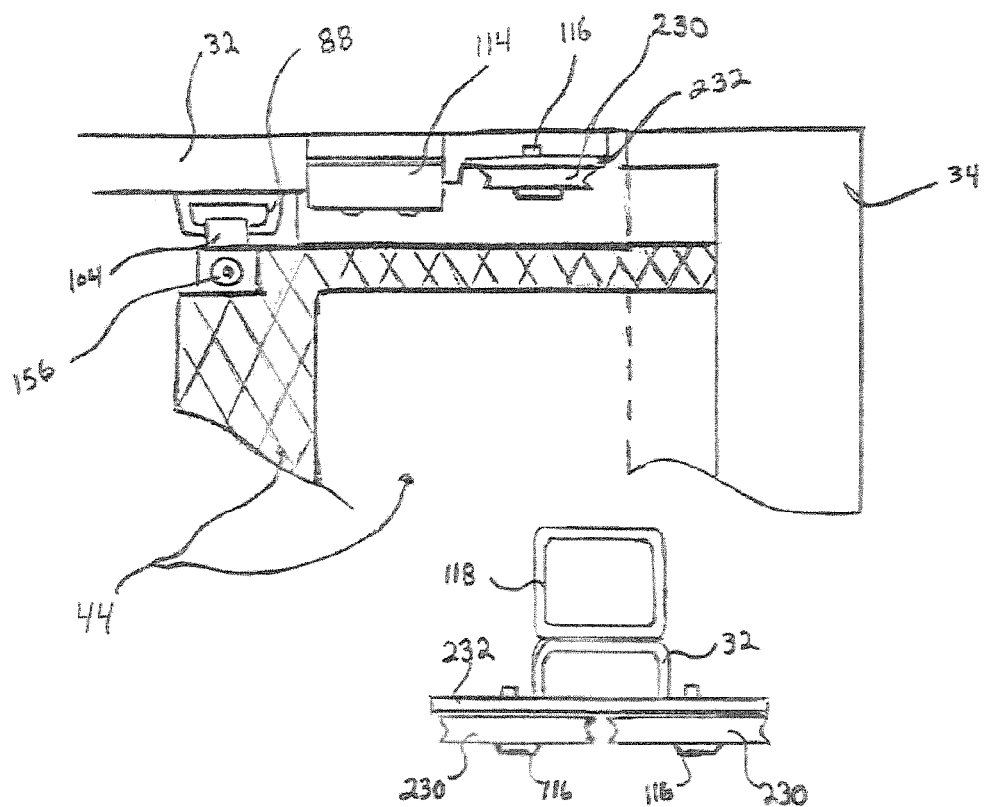
FIG. 15 a right inside view of the upper portion of the retractable enclosure assembly.

Referring now to FIG. 15, shown is an inside view of the right rear side of the retractable enclosure 8 as seen from driver seat of golf cart showing limit switch mounting bracket 114's position and guide roller mounting plate 232 which is attached to horizontal upper track 32 with adhesive. Horizontal upper track spacer 118 is shown on top of horizontal track 32. Guide roller 230 is attached to the guide roller mounting plate 232 with rivet 116.

Figure 16:
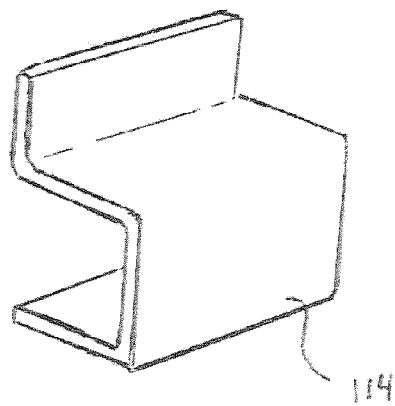
FIG. 16 is a perspective view of the limit switch mounting bracket.

Referring now to FIG. 16, shown is a perspective view of limit switch mounting bracket 114.

Figure 17:
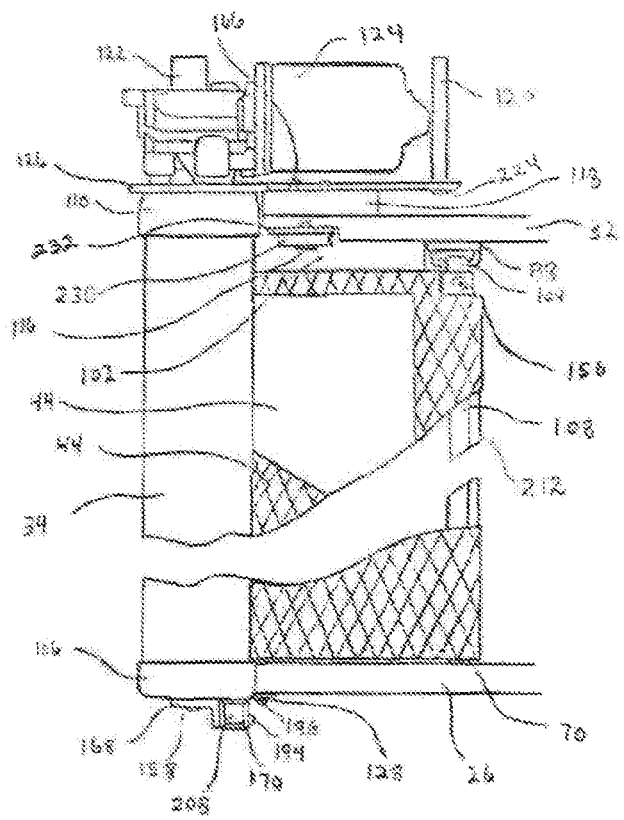
FIG. 17 is a side view of the roll-back panel housing and track assembly.

Referring now to FIG. 17, shown is a perspective view of roll-back panel housing 34, horizontal tracks 28 and 32 and related items. Starting at the top of the drawing, cap mounting block 122 is attached by adhesive to motor 124 which is sitting on upper mounting plate 126 which has cap post 120 attached to upper mounting plate 126 by screw 224. Motor 124, upper mounting plate 126 and roll-back panel housing upper end cap 110 are all three attached by bolts 164 (not shown). Horizontal upper track 32 is attached by screws 166, which go through upper mounting plate 126, spacer block 118 and upper track 32 and are secured with nuts 166a, which are on the underside of upper mounting track 32. Roll-back panel housing upper end cap 110 and roll-back housing lower end cap 106 are attached by adhesive to roll-back panel housing 34. Lower end cap 106 is attached to lower mounting plate 128 and angle bracket 168 by screws 158 and nuts 160 (not shown). Horizontal lower track 26 is attached to lower mounting plate 128 by screw 196a and nut 196.

Figure 18:
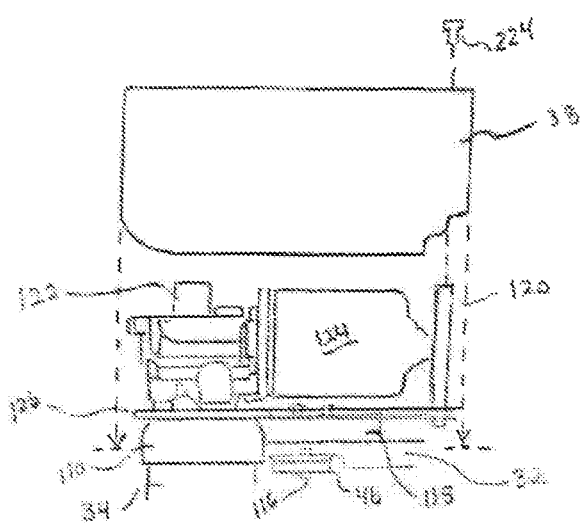
FIG. 18 is an exploded side view of the motor and motor cover.

Referring now to FIG. 18, shown is an exploded view of the motor 124 and motor cover 38 which attaches to cap mounting block 122 with adhesive and to cap post 120 with screw 224.

Figure 19:
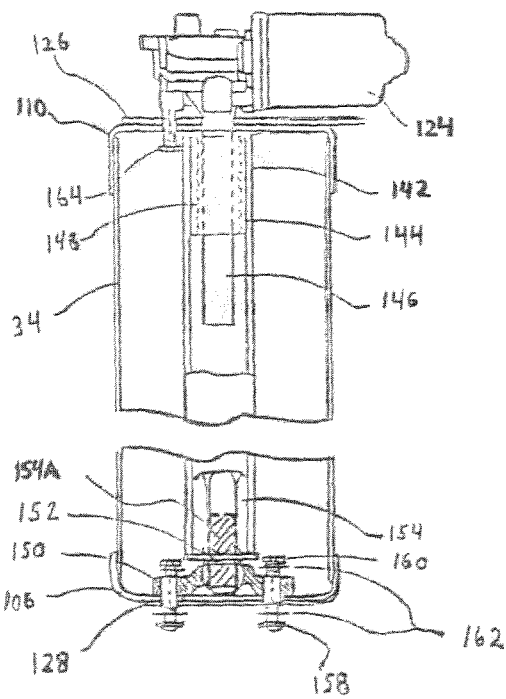
FIG. 19 is a cutaway view of the roll-back panel housing and motor assembly.

Referring now to FIG. 19, shown is a cutaway view of roll-back panel housing 34 and motor 124 assembly. Motor 124 is on top of upper mounting plate 126 which is on top of roll-back panel housing upper end cap 110. Bolts 164 attach motor 124, upper mounting plate 126, and roll-back housing upper end cap 110 together. Roller tube 142 is shown with roller clutch bearing 144 inside of roller tube 142. Roller clutch bearing 144 is shown with bearing inner sleeve 148 which is attached to motor shaft 146 by adhesive. Roller tube 142 bottom end has roller tube end plastic socket 154 inserted into roller tube 142. Roller tube end guide pin 154a is inserted into roller tube end plastic socket 154 and flange bearing 150. Washer 152 is placed upon end guide pin 154a. Screws 158 go through lower mounting plate 128, roll-back panel housing lower end cap 106 and flange bearing 150, connecting to nut 160.

Figure 20:
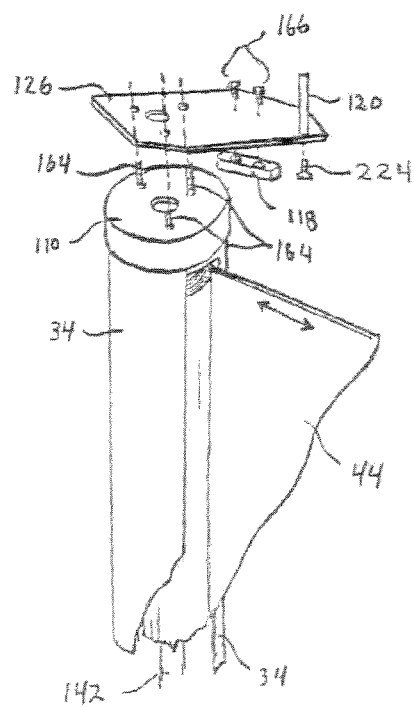
FIG. 20 is a cutaway view of the roll-back panel housing and upper mounting plate.

Referring now to FIG. 20, shown is a view of how roll-back panel 44 feeds into, and rolls up on, roller tube 142. Roll-back panel 44 is attached to roller tube 142 with adhesive. As roller tube 142 rotates in a counter clock-wise direction, the roll-back panel 44 coils onto roller tube 142. Opposite rotation uncoils the roll-back panel 44. Shown are bolts 164 which go through roll-back panel housing upper end cap 110, upper mounting plate 126 and into threaded holes in motor 124.

Referring now to FIG. 21, shown is a perspective view of lower support mounting assembly. Lower support tube 170 is attached to lower support tube mounting plate 172 by bolts 214 and nuts 214a (not shown). Lower support tube mounting plate 172 attaches to OEM factory frame 176 with bolts 178, bar clamp 174 and nuts 180.

Referring now to FIG. 22, shown is an exploded view showing placement of flange bearing 150 inside roll-back panel lower end cap 106. Screws 158 attach angle bracket 168, mounting plate 128, roll-back panel housing lower end cap 106 and flange bearing 150 together, with nuts 196. Angle bracket 168 attaches to lower support tube 170 with screws 194 and nuts 196. Square end plug 210 is also shown inserted into end of lower support tube 170.

Referring now to FIG. 23, shown is a perspective view of horizontal lower track 26 and how it attaches to lower mounting plate 128 with screw 194 and nut 196.

Figure 24:
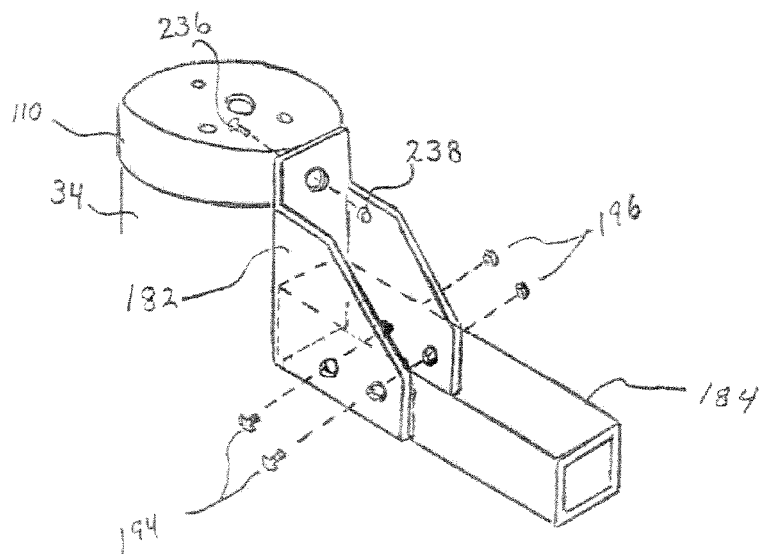
FIG. 24 is a perspective view of the roll-back panel housing upper mounting bracket and support crossbar.

Referring now to FIG. 24, shown is a perspective view of roll-back panel housing upper support tube mounting bracket 182 which attaches to roll-back panel housing upper end cap 110 with screw 236 and nut 238. Bracket 182 attaches to roll-back panel housing upper support crossbar 184 with screws 194 and nuts 196.

Figure 25:
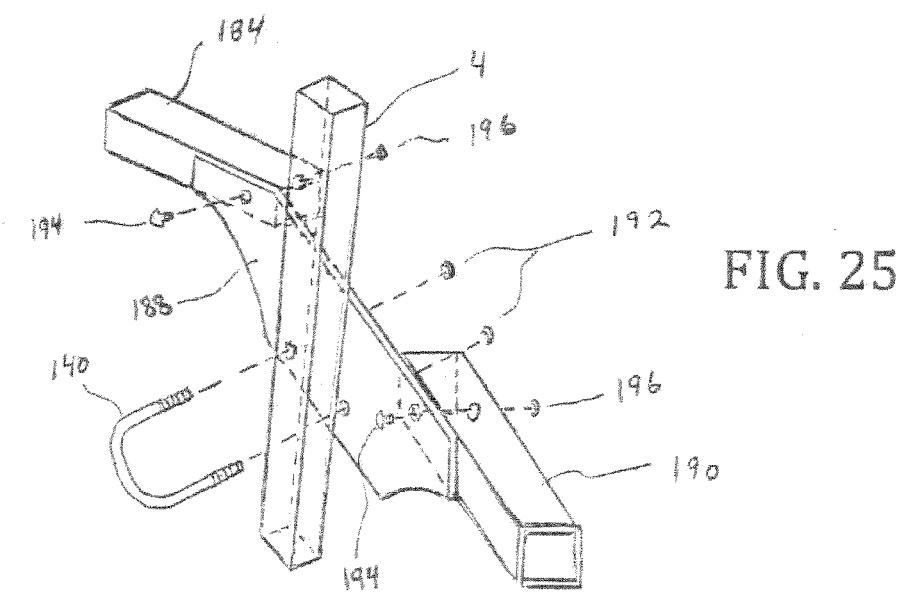
FIG. 25 is a perspective view of the roll-back panel housing upper support crossbar, rear roof support attachment bracket, and center crossbar.

Referring now to FIG. 25, shown is a perspective view of roll-back housing tube cross brace 188 attached to OEM factory golf cart rear roof support 4 which has U-bolt 140 around it and through cross brace 188. U-bolt 140 is secured with nuts 192. Roll-back housing tube cross brace 188 attaches to roll-back panel housing upper support crossbar 184 and center crossbar 190 with screws 194 and nuts 196.

Referring now to FIG. 26, shown is a rear view of golf cart 10 showing right rear filler panel 30 connected to roll-back panel housing 34, roof support right rear 4 and roll-back panel housing upper support cross bar 184. Rear window filler panel 248 is connected to left rear roof support 4a, right rear roof support 4, filler panel 28 and right rear filler panel 30. Left rear filler panel 28 is connected to roof support 4a, roll-back panel housing 36, roll-back housing upper support cross bar 184a and rear window filler panel 248.

Referring now to FIG. 27, shown is another embodiment with a cutaway view of spring 242 replacing motor 124 and 124a and electrical components 114a, 114b, 250, 258 and 260, with fixed bracket 244 and tubular drive 246. This embodiment relates to a non-electric version which is manually pulled open and closed using the springs' energy to coil and uncoil the roll-back panels 44 and 44a onto roller tubes 142 into the roll-back panel housings, 34 and 36, respectively.

Figure 28:
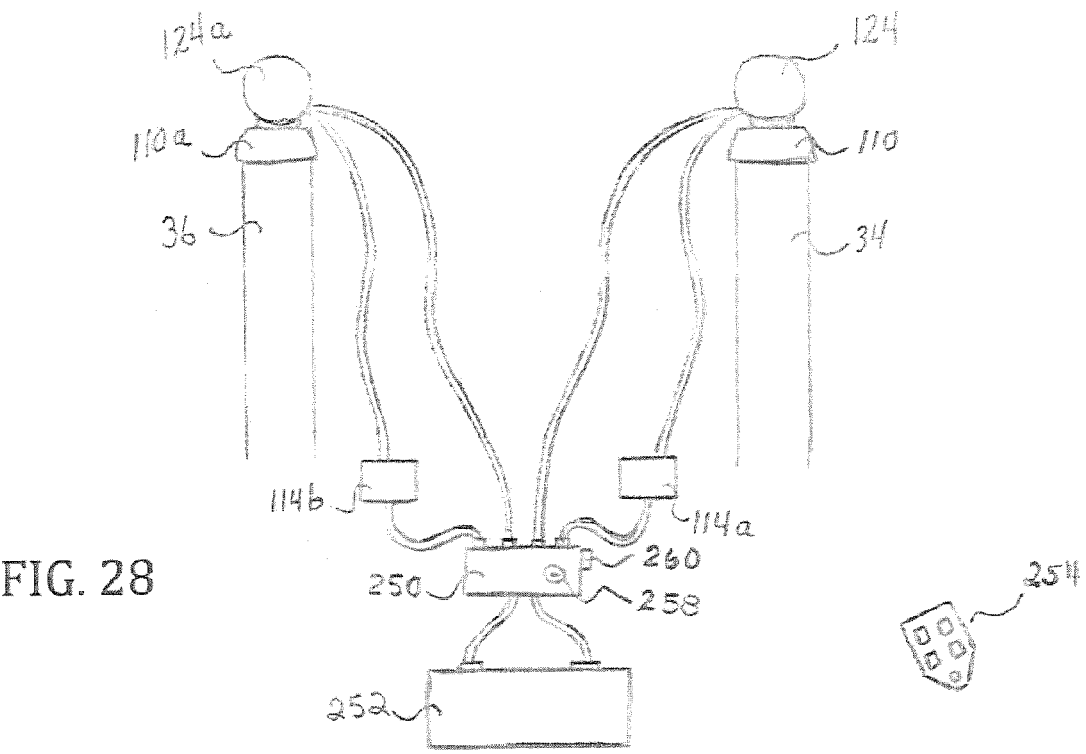
FIG. 28 is a diagram showing electrical components.

Referring now to FIG. 28, shown is a diagram of the following electrical items: motor 124, motor 124a, limit switch 114a, limit switch 114b, control box 250, key switch 258 and battery 252.

Figure 29:
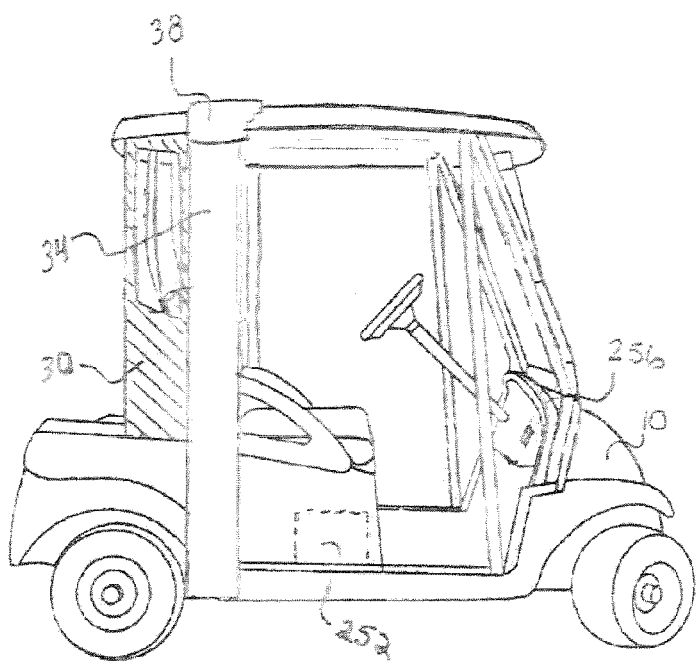
FIG. 29 is a side view of golf cart 10.

Referring now to FIG. 29, shown is a side view of golf cart 10, control switch 256, motor cover 38, roll-back panel housing 34 right rear filler panel 30.

In operation, the user first activates the retractable enclosure by pressing a switch 254 or 256 to activate the motor 124 or 124a of the retractable enclosure to initiate the opening or closing of the enclosure flexible door panel 44 based upon which switch 256 or button on the remote control 254 the user pushes. Electrical current flows from the battery 252 to the control box 250 and circuit breaker 260, then through wires to the motor 124 or 124a of which side the user is pressing the corresponding button on remote control 254 or switch 256 for. Limit switches 114a and 114b are provided to stop the motors 124 and 124a when the retractable door panels 44 and 44a have coiled up into the roll-back panel housing 34 and 36. The roller clutch bearing 144 on the retractable enclosure motor shaft 146 is designed to spin freely on motor shaft 146 if an obstruction is in path of the closing door and motors 124 and 124a will not exert additional force to close door. The constant force spring assemblies 64 in the front vertical posts 20 and 22 maintain tension on the retractable enclosure door to enable closing of the door and maintaining tautness of the retractable door panel 44.

In another embodiment, motors 124 and 124a and electrical components 114a, 114b, 250, 258 and 260 are replaced by a spring 242, mounted inside the roll-back panel roller 142 providing the springs' energy to the tube 142 for coiling and uncoiling the roll-back panel 44 manually.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

Figure Numbering List

4 Roof support, right rear
4a Roof support, left rear
6 Roof support, right front
8 Golf cart retractable enclosure
10 Golf cart
12 Roof support, left front
14 Filler panel, left front
16 Filler panel, right front
18 Vertical post inner
20 Vertical post outer
22 Vertical post outer
24 Vertical post inner
26 Horizontal lower track
28 Left rear filler panel
30 Right rear Filler panel
32 Horizontal upper track
34 Roll-back panel housing, right side
36 Roll-back panel housing, left side
38 Roll-back panel housing motor cover
40 Golf cart roof
42 Golf cart floor
44 Roll-back panel, flexible cover material, right side
44a Roll-back panel, flexible cover material, left side
46 Sheave
48 Sheave bearing
50 not used
52 Swage sleeve
54 2-piece mate rivet
56 Constant force spring assembly
58 Spacer
58a Spacer
60 Constant force spring
62 Constant force spring drum roller
64 Constant force spring assembly
66 Rectangular end plug
68 Angle bracket
70 Bottom track guide roller
72 Spring
74 Felt washer
76 Washer
78 Bolt
80 Track bar lower end guide plug
82 Axle
84 Wheel
86 Washer
88 Track slide
90 Cable
92 Cable end stop
94 Low friction plastic track insert
96 Channel-shaped opening upper track
98 Woven rope
100 Low friction fabric
102 Guide tape
104 U-bracket track bar
106 Roll-back panel housing lower end cap
108 Track bar
110 Roll-back panel housing upper end cap, right side
110a Roll-back panel housing upper end cap, left side
112 Track bar top end
114 Limit switch bracket
114a Limit switch
114b Limit switch
116 Rivet
118 Top track spacer
120 Cap post
122 Cap mounting block
124 Motor, right side
124a Motor, left side
126 Upper mounting plate
128 Lower mounting plate
130 Mounting plate
132 Upper front bracket, Yamaha
134 Lower front bracket, Yamaha
136 Upper front bracket, Club Car
138 Lower front bracket, Club Car
140 U-bolt
142 Roller tube, right side
144 Roller clutch bearing
146 Motor shaft
148 Roller clutch bearing inner race
150 Flange bearing
152 Washer
154 Roller tube end plastic socket
154a Roller tube end plastic socket pin
156 2-piece mate rivet
158 Screw 160 Nut
162 Washer
164 Motor bolt
166 Screw
166a Nut
168 Angle bracket
170 Roll-back panel housing lower support tube
172 Lower support tube mounting plate
174 Lower support tube mounting plate bar clamp
176 OEM factory golf cart frame
178 Bolt
180 Nut
182 Roll-back panel housing upper mounting plate
184 Roll-back panel housing upper support crossbar
184a Roll-back panel housing upper support crossbar
186 not used
188 Roll-back panel housing tube cross-brace
190 Center crossbar
192 Nut
194 Screw
196 Nut
196a Screw
198 Mate rivet-male
200 Mate rivet-female
202 Screw
204 Nut
206 Screw
208 Nut
210 Square end plug
212 Foam cushion strip
214 Bolt
214a Nut
216 Screw
218 Nut
220 Screw
222 Nut
224 Self-tapping screw
226 Screw
228 Nut
230 Guide roller
232 Guide roller mounting plate
234 not used
236 Bolt
238 Nut
240 Magnet
242 Spring
244 Fixed bracket
246 Tubular drive
248 Rear window filler panel
250 Control Box
252 Battery
254 Remote control
256 Control switch
258 Key switch
260 Circuit breaker That which is claimed is:

1. A retractable enclosure mountable on a recreational vehicle, the retractable enclosure comprising:
a roll-back panel movable between an open position and a closed position, the roll-back panel in the open position being in a rolled condition, the roll-back panel having a leading edge;
a tensioning element connected to the leading edge of the roll-back panel; and
a motor, the motor operatively associated with the roll-back panel to move the roll-back panel between the closed position and the open position, the motor mounted above the roll-back panel when the roll-back panel is in the open position.

2. The retractable enclosure of claim 1, wherein the recreational vehicle is a golf cart.

3. The retractable enclosure of claim 1, further comprising a switch, the switch operable to activate the motor to move the roll-back panel between the closed position and the open position.

4. The retractable enclosure of claim 1, further comprising a remote control, the remote control operable to activate the motor to move the roll-back panel between the closed position and the open position.

5. The retractable enclosure of claim 1, wherein the tensioning element includes at least one spring.

6. The retractable enclosure of claim 1, wherein the tensioning element includes a magnet.

7. The retractable enclosure of claim 1, further comprising a spring biasing the roll-back panel towards the open position.

8. The retractable enclosure of claim 1, further comprising a roll-back panel housing, the roll-back panel housing enclosing the roll-back panel when the roll-back panel is in the open position.

9. The retractable enclosure of claim 1, further comprising an upper track and a lower track, a top edge of the roll-back panel movable within the upper track between the open position and the closed position.

10. The retractable enclosure of claim 1, further comprising a track bar attached to the leading edge of the roll-back panel, each end of the track bar attached to the tensioning element.

11. A retractable enclosure system mountable on a recreational vehicle, the system comprising:
a first roll-back panel movable between an open position and a closed position on a first side of the recreational vehicle, the first roll-back panel in the open position being in a rolled condition, the first roll-back panel having a leading edge;
a first motor operatively associated with the first roll-back panel to move the first roll-back panel between the closed position and the open position, the first motor mounted above the first roll-back panel when the first roll-back panel is in the open position;
a second roll-back panel movable between an open position and a closed position on a second side of the recreational vehicle, the second roll-back panel in the open position being in a rolled condition, the second roll-back panel having a leading edge; and
a second motor operatively associated with the second roll-back panel to move the second roll-back panel between the closed position and the open position.

12. The system of claim 11, further comprising at least one filler panel.

13. The system of claim 11, further comprising a first switch and a second switch, the first switch operable to activate the first motor to move the first roll-back panel between the closed position and the open position, the second switch operable to activate the second motor to move the second roll-back panel between the closed position and the open position.

14. The system of claim 11, further comprising:
a first tensioning element connected to the leading edge of the first roll-back panel; and
a second tensioning element connected to the leading edge of the second roll-back panel.

15. A method of installing a retractable enclosure system mounted on a recreational vehicle, the method comprising:
placing a first roll-back panel on a first side of the recreational vehicle, the first roll-back panel movable between an open position and a closed position, the first roll-back panel in the open position being in a rolled condition, the first roll-back panel in the closed position covering at least a portion of the first side; and
placing a second roll-back panel on a second side of the recreational vehicle, the second roll-back panel movable between an open position and a closed position, the second roll-back panel in the open position being in a rolled condition, the second roll-back panel in the closed position covering at least a portion of the second side.

16. The method of claim 15, further comprising:
attaching a first motor to the first roll-back panel, the first motor operatively associated with the first roll-back panel to move the first roll-back panel between the closed position and the open position; and
installing a switch inside the recreational vehicle, the switch operable to activate the first motor to move the first roll-back panel between the closed position and the open position.

17. The method of claim 15, further comprising:
placing a first tensioning element on the first side, the first tensioning element connected to a leading edge of the first roll-back panel; and
placing a second tensioning element on the second side, the second tensioning element connected to a leading edge of the second roll-back panel.

18. The method of claim 15, further comprising:
placing a first filler panel on the first side adjacent to the first roll-back panel;
placing a second filler panel on the second side adjacent to the second roll-back panel; and
placing at least one rear filler panel on a rear side of the recreational vehicle.

19. The method of claim 15, wherein the recreational vehicle is a golf cart.

20. The method of claim 15, further comprising placing an upper track and a lower track on the first side of the recreational vehicle, a top edge of the first roll-back panel movable within the upper track between the open position and the closed position.

* * * * *